United States Patent
Wittmer et al.

(10) Patent No.: US 10,073,455 B2
(45) Date of Patent: *Sep. 11, 2018

(54) VEHICLE HEADING ERROR COMPENSATION

(71) Applicant: Sikorsky Aircraft Corporation, Stratford, CT (US)

(72) Inventors: Kenneth S. Wittmer, Sandy Hook, CT (US); Stephen Kubik, Shelton, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 15/068,127

(22) Filed: Mar. 11, 2016

(65) Prior Publication Data
US 2016/0195874 A1 Jul. 7, 2016

Related U.S. Application Data

(63) Continuation of application No. 14/095,379, filed on Dec. 3, 2013, now Pat. No. 9,360,869.

(51) Int. Cl.
G05D 1/08 (2006.01)
G05D 1/02 (2006.01)

(52) U.S. Cl.
CPC ......... G05D 1/0202 (2013.01); G05D 1/085 (2013.01); G05D 1/0858 (2013.01)

(58) Field of Classification Search
None
See application file for complete search history.

(56) References Cited

U.S. PATENT DOCUMENTS

| | | | | |
|---|---|---|---|---|
| 3,048,836 A * | 8/1962 | Guarino | ............... | G05D 1/0669 340/870.34 |
| 5,050,086 A * | 9/1991 | Lambregts | ............. | G05D 1/085 244/179 |
| 5,060,889 A | 10/1991 | Nadkarni et al. | | |
| 5,195,039 A | 3/1993 | Gold et al. | | |
| 5,195,700 A | 3/1993 | Fogler, Jr. et al. | | |
| 5,213,283 A | 5/1993 | Gold et al. | | |
| 5,238,203 A | 8/1993 | Skonieczny et al. | | |
| 5,553,812 A | 9/1996 | Gold et al. | | |
| 6,102,330 A | 8/2000 | Burken et al. | | |
| 6,243,649 B1 * | 6/2001 | Wetherbee | ........... | G01C 21/005 33/356 |

(Continued)

OTHER PUBLICATIONS

Darby, Gary (Jan. 15, 2011): Wind Traingle Retreived from http://delphiforfun.org/programs/Math_Topics/WindTriangle.htm.

*Primary Examiner* — Mussa A Shaawat
*Assistant Examiner* — Abdhesh Jha
(74) *Attorney, Agent, or Firm* — Cantor Colburn LLP

(57) ABSTRACT

Systems and methods for controlling aircraft obtain at least one of ground-referenced longitudinal movement data of the aircraft and ground-referenced lateral movement data of the aircraft. A round-referenced heading of the aircraft is obtained and a heading error is calculated based on a difference between the ground-referenced heading and a target heading. A lateral movement error value is generated based on at least one of the ground-referenced longitudinal movement data and ground-referenced lateral movement data, and based on the heading error.

13 Claims, 4 Drawing Sheets

(56) References Cited

U.S. PATENT DOCUMENTS

| | | |
|---|---|---|
| 7,555,371 B2 | 6/2009 | Lebrun et al. |
| 7,769,512 B2 | 8/2010 | Norris et al. |
| 8,332,082 B2 | 12/2012 | Christensen et al. |
| 8,392,039 B2 | 3/2013 | He et al. |
| 2007/0032924 A1 | 2/2007 | Foucart et al. |
| 2008/0075591 A1 | 3/2008 | Builta |
| 2013/0204467 A1* | 8/2013 | Spinelli ............... G05D 1/0204 701/3 |

* cited by examiner

VEHICLE HEADING ERROR COMPENSATION

CROSS-REFERENCE TO RELATED APPLICATIONS

This application is a continuation of U.S. patent application Ser. No. 14/095,379 filed on Dec. 3, 2013, which is incorporated herein by reference.

BACKGROUND OF THE INVENTION

The subject matter disclosed herein relates to controlling vehicles and in particular to compensating for a heading error of the vehicle when calculating lateral and longitudinal ground speeds.

Aircraft are typically controlled by controls that adjust a pitch, yaw and roll of the aircraft. A difference between the target heading, or the heading indicated by a pilot's control, and the actual yaw results in a heading error of the aircraft. Likewise, a difference between a lateral ground speed target and an actual ground speed results in a lateral ground speed error, and a difference between a longitudinal ground speed target and an actual ground speed results in a longitudinal ground speed error. Conventional systems correct the lateral ground speed error by adjusting the roll of the aircraft and correct the longitudinal ground speed error by adjusting the pitch of the aircraft. However, these systems may not take into account a relationship between the heading error and the actual lateral and longitudinal ground speeds. Over-compensation or under-compensation of lateral and longitudinal ground speeds may result.

BRIEF DESCRIPTION OF THE INVENTION

According to one aspect of the invention, a method for controlling an aircraft includes obtaining at least one of ground-referenced longitudinal movement data of the aircraft and ground-referenced lateral movement data of the aircraft. The method includes obtaining a ground-referenced heading of the aircraft and calculating a heading error based on a difference between the ground-referenced heading and a target heading. The method further includes generating a lateral movement error value based on at least one of the ground-referenced longitudinal movement data and ground-referenced lateral movement data, and based on the heading error.

According to another aspect of the invention, an aircraft control system includes a flight control computer having a data input to receive a measured longitudinal movement value of an aircraft, a measured lateral movement value of the aircraft and a measured heading of the aircraft. The flight control computer also has a data processor configured to calculate a heading error based on a difference between the measured heading and a target heading and configured to generate a lateral movement error value based on the measured lateral movement value and the heading error.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Conventional aircraft control systems fail to take into account the coupling of a heading of the aircraft with lateral and longitudinal groundspeed, which may adversely affect aircraft control. Embodiments of the invention relate to controlling a vehicle's longitudinal and lateral ground speed by taking into account a heading of the vehicle.

Figure 1:
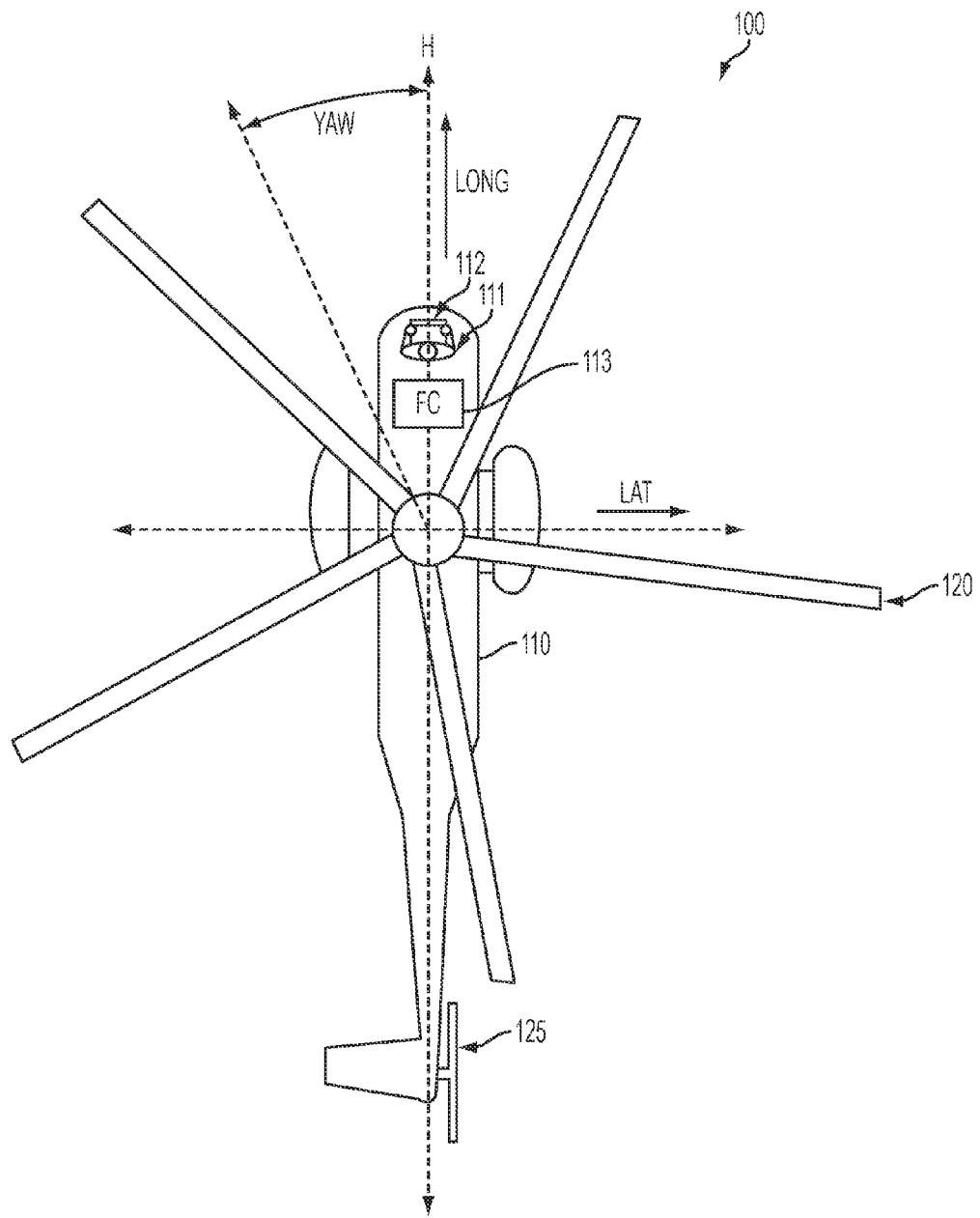
FIG. 1 illustrates an aircraft according to an embodiment of the invention.

FIG. 1 illustrates an aircraft 100 according to an embodiment of the invention. While FIG. 1 illustrates a helicopter, embodiments of the invention encompass any other rotary-wing aircraft, VTOL aircraft, thrust-based aircraft (i.e. non-rotor-based), and any other vehicle capable of controlling a heading, lateral movement, longitudinal movement, and position of the aircraft. The aircraft 100 includes a fuselage 110, a first rotor assembly 120 and a second rotor assembly 125. The first rotor assembly 120 rotates to lift and maintain the aircraft 100 airborne. The first and second rotor assemblies 120 and 125 together control the pitch, yaw and roll of the aircraft 100. In the embodiment illustrated in FIG. 1, the rotor assembly 120 includes only one rotor including multiple rotor blades that rotate on a same plane. However, embodiments of the invention encompass any number of rotor assemblies, including rotor-based systems having multiple co-axial rotors, multiple rotor assemblies that are not co-axial, or non-rotor based designs utilizing thrust vectoring.

The fuselage 110 houses a pilot 111, physical flight controls 112, and a flight control computer 113. In operation, the pilot 111 physically manipulates the physical flight controls 112, which may include a stick, lever, wheel, or any other type of physical control, to generate command signals or values for longitudinal movement, lateral movement, yaw and collective movement of the system 100. The flight control computer 113 may interpret positions of mechanical components to generate the commands, or the flight controls 112 may include sensors or other mechanisms to translate physical positions and movements into electrical signals that are transmitted to the flight control computer 113.

The flight control computer 113 includes memory, one or more data processors, logic and other circuitry to generate, process, and/or transmit the command signals or values. The command signals may include a lateral command, a longitudinal command, a yaw command and a collective command to control lateral movement of the aircraft 100, longitudinal movement of the aircraft 100, a rotation of the aircraft 100 and collective movement of the aircraft 100. It is understood that the longitudinal command corresponds to a forward and backward motion (LONG) of the fuselage 110, and in particular to the lowering and raising of the nose and the tail; the lateral command corresponds to a side-to-side motion (LAT) of the fuselage 110, and in particular to a roll motion of the fuselage 110; yaw corresponds to rotation (YAW) of the fuselage 110 to the right or left to change a direction of the nose of the fuselage 110; and the collective command corresponds to the raising or lowering of the entire fuselage 110 simultaneously. As illustrated in FIG. 1, the heading (H) of the aircraft 100 corresponds to a direction that the aircraft 100 is facing.

The flight control computer 113 may store flight control programs and other electronics that may take into account various environmental conditions and characteristics of the system 100 to generate the command signals. The command signals are transmitted to the rotor assembly 120 to control the rotor assembly 120.

While FIG. 1 illustrates controls 112 that are physically manipulated by a pilot 111, embodiments of the invention are not limited to a human pilot 111 or a pilot 111 located in the fuselage 110. In alternative embodiments, the aircraft 100 may be controlled by a computer executing a computer program, or the aircraft 100 may be controlled remotely by a human or computer controller that is not located in the fuselage 110. In such an embodiment, a computer may replace the physical controls 112 to generate the lateral, longitudinal, yaw, and collective commands.

Figure 2:
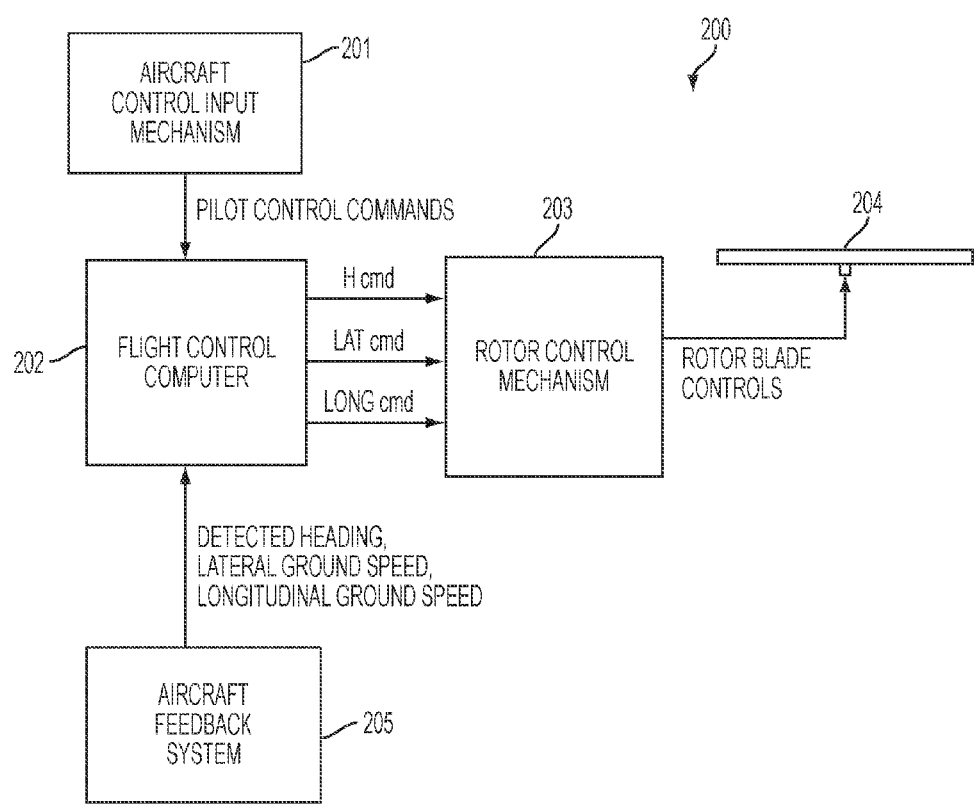
FIG. 2 illustrates a block diagram of an aircraft control system according to one embodiment of the invention.

FIG. 2 illustrates an aircraft control system 200 according to an embodiment of the invention. Pilot control commands are generated by an aircraft control input mechanism 201. The aircraft control input mechanism 201 may correspond to the physical pilot controls 112 of FIG. 1, to a receiver that receives remote commands, to a computer that generates pilot commands or any other mechanism capable of generating pilot control commands to pilot an aircraft.

The flight control computer 202 receives the pilot control commands and generates flight control signals to control heading, lateral movement and longitudinal movement of the aircraft. The flight control computer 202 may generate additional commands such as a collective command or any other desired flight control command. FIG. 2 illustrates a heading command ($H_{cmd}$), lateral movement command ($LAT_{cmd}$) and longitudinal movement command ($LONG_{cmd}$). The flight control commands are provided to a rotor control mechanism 203, which generates rotor blade controls to control a rotor assembly 204. Embodiments of the invention encompass any type of rotor control mechanism 203 including a swashplate assembly, individually-controlled rotor blade servos or any other mechanism to control the rotor assembly 204 or alternative control methods for VTOL aircraft.

In embodiments of the invention, the rotor control mechanism 203 controls the rotor assembly 204 to adjust the yaw, pitch and roll of the aircraft according to the received heading command $H_{cmd}$, lateral movement command $LAT_{cmd}$ and longitudinal movement command $LONG_{cmd}$.

The aircraft feedback system 205 detects characteristics of the aircraft and provides detected heading, lateral movement and longitudinal movement information to the flight control computer 202. The aircraft feedback system 205 may measure the characteristics of the aircraft using any sensor assemblies or electronics, such as geographical position determining devices, motion sensors, accelerometers or any other devices.

Figure 3:
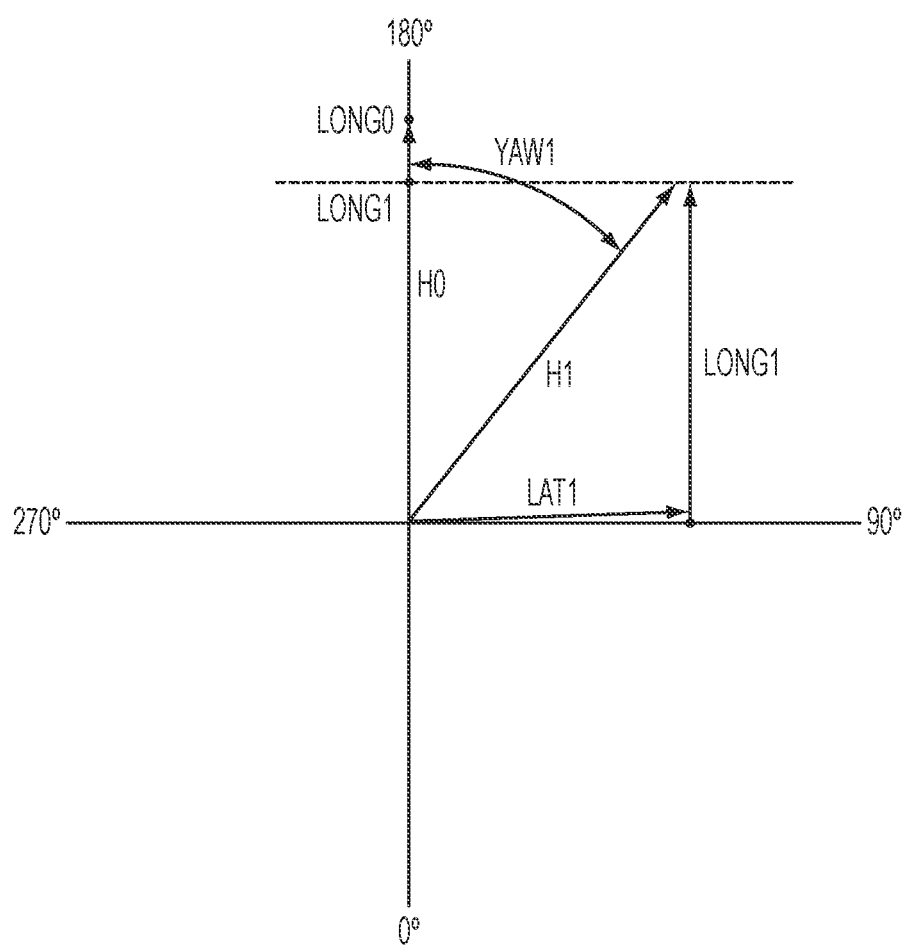
FIG. 3 is a diagram illustrating a heading error according to an embodiment of the invention.

Referring to FIGS. 2 and 3, the heading H0 of FIG. 3 is provided as an example of a heading target resulting from the pilot control commands $H_{cmd}$ of FIG. 2. In addition, the longitudinal value LONG0 of FIG. 3 is provided as an example of a longitudinal ground speed target $LONG_{cmd}$ resulting from the pilot control commands $LONG_{cmd}$ of FIG. 2. A lateral value is not illustrated in FIG. 3, representing a lateral ground speed target of zero (0), or a pilot command $LAT_{cmd}$ for a vehicle to have no lateral movement.

As illustrated in FIG. 3, when the detected heading H1 of the aircraft varies from the heading target H0, the heading error (YAW1) has a lateral movement element LAT1 and a longitudinal movement element LONG1. In particular, the heading error YAW1 causes the longitudinal movement to appear to be less than the longitudinal movement command value (LONG1<LONG0) and the lateral movement LAT1 appears to be greater than the lateral movement command value, which is zero (0) in the example illustrated in FIG. 3.

In conventional systems, if the lateral movement and longitudinal movement are corrected separately of the heading error, errors may result in the movement correction, resulting in too much or too little adjustment of pitch, roll and yaw.

Figure 4:
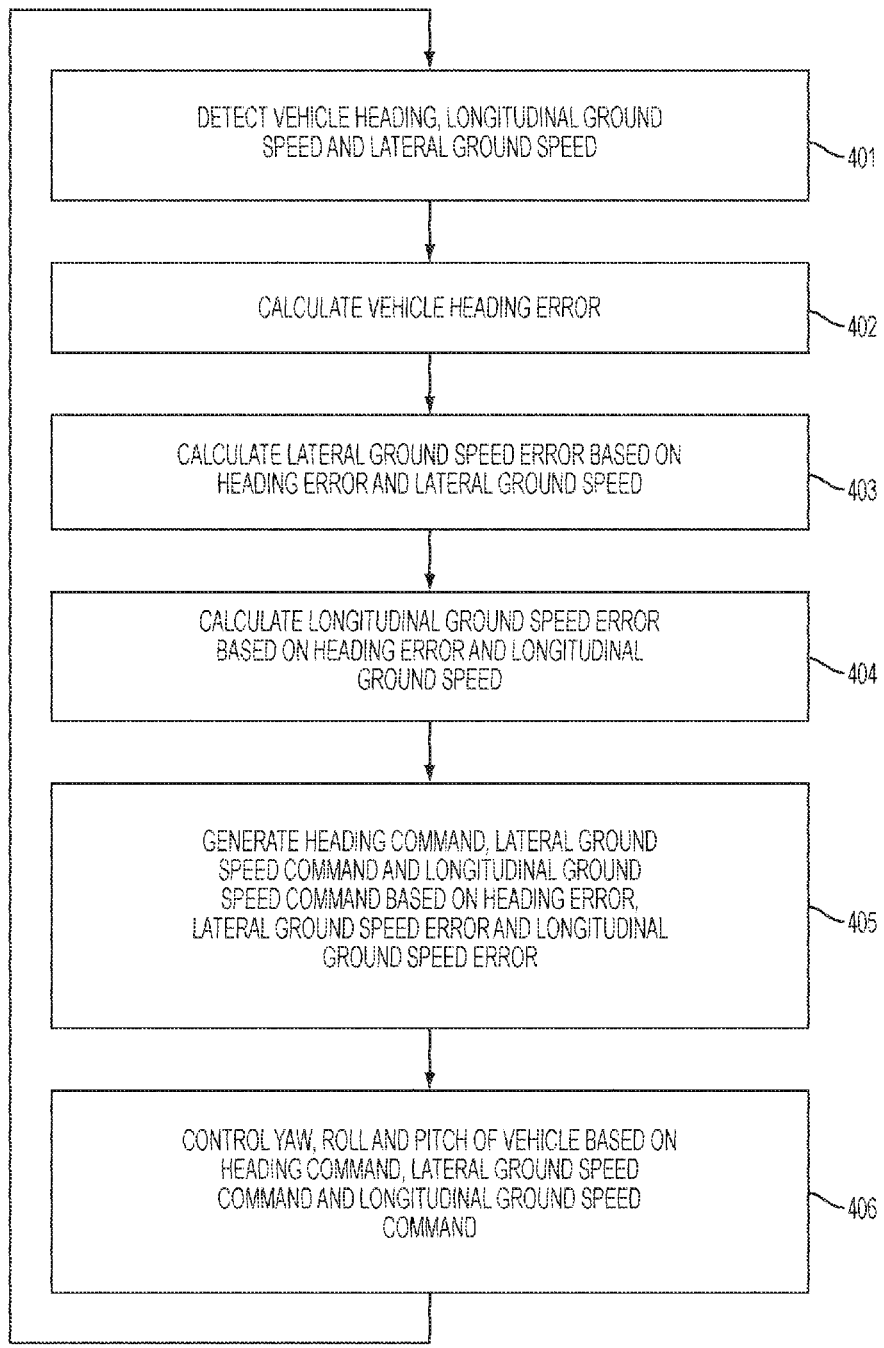
FIG. 4 is a block diagram of a method for controlling a vehicle according to an embodiment of the invention.

FIG. 4 illustrates a method according to an embodiment of the invention. In block 401, the heading, longitudinal ground speed and lateral ground speed of a vehicle, such as an aircraft, are measured, detected, or derived. The heading, longitudinal ground speed and lateral ground speed may be measured or detected by sensors, by electronics devices such as geographic position detection systems, global positioning systems or any other system or method. In addition, the longitudinal ground speed and lateral ground speed may be derived from measured velocities in alternate reference frames and corrected to the ground referenced frame via measured pitch, roll and heading values.

In block 402, a heading error is calculated by determining the difference between the target heading and the detected heading. The target heading may be provided by a pilot input or other flight control system.

In block 403, a lateral ground speed error is calculated based on the heading error and the detected lateral ground speed error. In addition, the lateral ground speed error may further be calculated based on the detected longitudinal ground speed.

In one embodiment, the lateral ground speed error value is calculated according to the following equation:

$$v_{err} = v_{tgt} - v\cos(\psi_{err}) + u\sin(\psi_{err}). \quad (1)$$

In the above equation (1), $v_{err}$ is the lateral ground speed error value, $v_{tgt}$ is a lateral ground speed target value, v is the detected lateral ground speed value, u is the detected longitudinal ground speed value and $\psi_{err}$ is a value of the heading error.

In block 404, a longitudinal ground speed error is calculated based on the heading error and the detected longitudinal ground speed error. In addition, the longitudinal ground speed error may further be calculated based on the detected lateral ground speed.

In one embodiment, the longitudinal ground speed error value is calculated according to the following equation:

$$u_{err} = u_{tgt} - u\cos(\psi_{err}) - v\sin(\psi_{err}). \quad (2)$$

In the above equation (2), $u_{err}$ is the longitudinal ground speed error value, $u_{tgt}$ is a longitudinal ground speed target value, u is the detected longitudinal ground speed value, v is the detected lateral ground speed value and $\psi_{err}$ is a value of the heading error.

In block 405, a heading command, lateral ground speed command and longitudinal ground speed command are generated based on the heading error, lateral ground speed error and longitudinal ground speed error.

In block 406, the yaw, roll and pitch of a vehicle are controlled based on the heading command, lateral ground speed command and longitudinal ground speed command.

For example, in an embodiment in which the vehicle is a helicopter, a swashplate or individual rotor blade servos are controlled, and a tail rotor may also be controlled, to control the yaw, roll and pitch of the helicopter.

In embodiments of the invention, the flight control computer 113 of FIG. 1 or 202 of FIG. 2 may perform the calculation and generation operations of blocks 402-405. In addition, the rotor control mechanism 203 of FIG. 2 may control the yaw, roll and pitch of the aircraft. However, embodiments of the invention encompass any computer, computer system or network of computers or electrical devices capable of receiving measurements, calculating error values, generating commands to control a vehicle and generating vehicle control signals based on the commands.

According to embodiments of the invention, a vehicle, such as an aircraft, is controlled by adjusting the yaw, pitch and roll of the aircraft. The heading is measured as well as the lateral ground speed and longitudinal ground speed. Error values are calculated for each of the heading, lateral ground speed and longitudinal ground speed to account for differences between a target heading, lateral ground speed and longitudinal ground speed and the detected values. The error values of the lateral and longitudinal ground speeds take into account the heading error to account for the coupling relationship between the heading error and the lateral and longitudinal ground speeds.

While an embodiment has been described in FIG. 4 with respect to ground speed by way of example, it is understood that embodiments of the invention encompass any ground-referenced motion data, including ground speed, ground acceleration (i.e., acceleration of a vehicle with respect to the ground), and ground position (i.e., position of the vehicle with respect to the ground). The ground-referenced motion data may be sensed directly by sensors, or may be derived from other data. For example, while a ground position may be sensed directly by sensors or a wireless position-determining systems (e.g., a global positioning system (GPS)), acceleration and speed may also be derived from sensor data or from transforms of heading data, pitch data or any other sensed data.

Embodiments of the invention include methods and systems for generating error values and correcting the flight controls of an aircraft. The method includes obtaining at least one of ground-referenced longitudinal movement data of the aircraft and ground-referenced lateral movement data of the aircraft. In embodiments of the invention, the term "movement data" refers to one or more of position data (i.e., data that does not include speed or acceleration), speed data, acceleration, or any other derivative of acceleration (e.g., changes in acceleration). The method also includes obtaining a ground-referenced heading of the aircraft. A heading error is calculated based on a difference between the ground-referenced heading and a target heading. A lateral error value is generated based on at least one of the ground-referenced longitudinal movement data and ground-referenced lateral movement data, and based on the heading error.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for controlling an aircraft, comprising:
obtaining at least one of longitudinal ground speed and a lateral ground speed of the aircraft;
obtaining a ground-referenced heading of the aircraft;
calculating a heading error based on a difference between the ground-referenced heading and a target heading;
generating a lateral movement error value defining a ground-referenced lateral speed error value based on the heading error, the longitudinal ground speed and the lateral ground speed and the equation: $v_{err}=v_{tgt}-v\cos(\psi_{err})+u\sin(\psi_{err})$, wherein $v_{err}$ is the ground-referenced lateral speed error value, $v_{tgt}$ is a lateral ground speed target value, v is a detected or derived lateral ground speed value, u is a detected longitudinal ground speed value and $\psi_{err}$ is a value of the heading error;
generating a lateral movement command signal based on the lateral movement error value to control a ground-referenced lateral speed of the aircraft; and
adjusting a control surface of the aircraft based on the lateral movement command signal.

2. The method of claim 1, wherein the lateral movement error value is further based on a longitudinal movement error corresponding to a difference between the longitudinal ground speed and a target longitudinal movement value.

3. The method of claim 1, wherein obtaining the at least one of longitudinal ground speed and a lateral ground speed includes obtaining both the longitudinal ground speed and the lateral ground speed.

4. The method of claim 3, wherein generating the lateral movement error value includes calculating a lateral ground speed error based on the heading error and the lateral ground speed, and a longitudinal ground speed error based on the heading error and the longitudinal ground speed.

5. The method of claim 3, further comprising generating a longitudinal movement command signal based on the longitudinal movement error value to control a longitudinal movement of the aircraft.

6. An aircraft control system, comprising:
a flight control computer having a data input to receive a measured longitudinal ground speed of an aircraft, a measured lateral ground speed of the aircraft and a measured heading of the aircraft, having a data processor configured to calculate a heading error based on a difference between the measured heading and a target heading and configured to generate a lateral movement error value defining a lateral ground speed error value based on the heading error, the measured longitudinal ground speed and the measured lateral ground speed and the equation $v_{err}=v_{tgt}-v\cos(\psi_{err})+u\sin(\psi_{err})$, wherein $v_{err}$ is the lateral ground speed error value, $v_{tgt}$ is a lateral ground speed target value, v is the measured lateral movement value, u is the measured longitudinal movement value and $\psi_{err}$ is a value of the heading error, the flight control computer being configured to generate a lateral movement command signal based on the lateral movement error value to control a lateral movement of the aircraft and adjust a control surface of the aircraft based on the lateral movement command signal.

7. The aircraft control system of claim 6, wherein the lateral movement error value is further based on the longitudinal movement value.

8. The aircraft control system of claim 6, further comprising a rotor control mechanism configured to receive the lateral movement command signal from the flight control computer and to mechanically control rotors of the aircraft based on the lateral movement command signal.

9. The aircraft control system of claim 6, wherein the data processor of the flight control computer is further configured to generate the lateral movement error value by calculating a lateral ground speed error based on the heading error and the lateral ground speed, and a longitudinal ground speed error based on the heading error and the longitudinal ground speed.

10. The aircraft control system of claim 9, wherein the data processor of the flight control computer is further configured to generate a longitudinal movement command signal based on the longitudinal movement error value to control a longitudinal movement of the aircraft.

11. The aircraft control system of claim 10, further comprising a rotor control mechanism configured to receive the longitudinal movement command signal from the flight control computer and to mechanically control rotors of the aircraft based on the longitudinal movement command signal.

12. The aircraft control system of claim 6, wherein the data processor of the flight control computer is further configured to generate a lateral movement command signal based on the lateral movement error value to control a lateral movement of the aircraft, the data processor of the flight control computer is configured to generate a longitudinal movement error value based on the measured longitudinal movement value and the heading error, and the data processor of the flight control computer is configured to generate a longitudinal movement command signal based on the longitudinal movement error value to control a longitudinal movement of the aircraft.

13. The aircraft control system of claim 12, wherein the longitudinal movement error value is a longitudinal ground speed error value, and the longitudinal ground speed error value is generated according to the equation:

$$u_{err} = u_{tgt} - u \cos(\psi_{err}) - v \sin(\psi_{err})$$

wherein $u_{err}$ is the longitudinal ground speed error value, $u_{tgt}$ is a longitudinal ground speed target value, u is the measured longitudinal movement value, and v is the measured lateral movement value.

* * * * *